US006131448A

United States Patent [19]

Hyodo et al.

[11] Patent Number: 6,131,448

[45] Date of Patent: Oct. 17, 2000

[54] DIAGNOSTIC APPARATUS AND METHOD FOR FUEL VAPOR TREATING APPARATUS

[75] Inventors: Yoshihiko Hyodo, Gotenba; Naoya Takagi, Susono, both of Japan

[73] Assignee: Toyota Jidosha Kabushiki Kaisha, Toyota, Japan

[21] Appl. No.: 09/257,311

[22] Filed: Feb. 25, 1999

[30] Foreign Application Priority Data

Mar. 4, 1998 [JP] Japan .................................. 10-052240

[51] Int. Cl.[7] .................................................. G01M 15/00

[52] U.S. Cl. ........................................................... 73/118.1

[58] Field of Search .................................... 73/39, 40, 46, 73/47, 49.7, 116, 117.2, 117.3, 118.1, 118.2

[56] References Cited

U.S. PATENT DOCUMENTS

| | | | |
|---|---|---|---|
| 5,146,902 | 9/1992 | Cook et al. | 73/118.1 |
| 5,295,472 | 3/1994 | Otsuka et al. . | |
| 5,297,529 | 3/1994 | Cook et al. . | |
| 5,411,004 | 5/1995 | Busato et al. . | |
| 5,425,344 | 6/1995 | Otsuka et al. . | |
| 5,898,108 | 4/1999 | Mieczkowski et al. | 73/118.1 |
| 6,016,690 | 1/2000 | Cook et al. | 73/49.2 |

FOREIGN PATENT DOCUMENTS

| | | |
|---|---|---|
| 5-125997 | 5/1993 | Japan . |
| 5-180099 | 7/1993 | Japan . |
| 6-108930 | 4/1994 | Japan . |
| 6-147031 | 5/1994 | Japan . |
| 6-235355 | 8/1994 | Japan . |

*Primary Examiner*—Eric S. McCall
*Attorney, Agent, or Firm*—Kenyon & Kenyon

[57] ABSTRACT

A diagnostic apparatus for a fuel vapor treating apparatus closes a breather to shut a purge system valve during purge. While further continuing the purge, the apparatus detects the purge flow thereby caused and a pressure change occurring in the purge system. Based on the purge flow and the pressure change, the space volume in the purge system is estimated. By comparing the estimated space volume and the actual space volume in the purge system, the apparatus determines whether there is a failure or fault in the purge system.

20 Claims, 10 Drawing Sheets

DIAGNOSTIC APPARATUS AND METHOD FOR FUEL VAPOR TREATING APPARATUS

INCORPORATION BY REFERENCE

The disclosure of Japanese Patent Application No. HEI 10-52240 filed on Mar. 4, 1998 including the specification, drawings and abstract are incorporated herein by reference in its entirety.

BACKGROUND OF THE INVENTION

1. Field of the Invention

The present invention relates to a diagnostic apparatus and a diagnostic method for a fuel vapor treating apparatus that introduces fuel vapor produced in a fuel tank into an intake system and then treats the fuel vapor.

2. Description of the Related Art

A diagnostic apparatus for a fuel vapor treating apparatus is disclosed in, for example, Japanese Patent Application Laid-Open No. HEI 6-235355. This diagnostic apparatus introduces negative pressure from an intake system into a purge system provided for introducing fuel vapor produced in a fuel tank into the intake system, and detects the value of a negative pressure in the purge system that converges after the introduction of negative pressure thereto. Then, the diagnostic apparatus compares the detected negative pressure value with a leak criterion to perform failure diagnosis.

This diagnostic apparatus performs diagnosis by detecting transition of pressure introduced into the purge system. As the space volume defined in the purge system is increased, the time needed for convergence of pressure value becomes longer. If the diagnostic time is long, external disturbances occurring during the diagnosis, such as an air temperature change, an air pressure change, a fuel temperature change, a change in the amount of fuel evaporation, a change in the amount of fuel consumption, and the like, may cause complex effects and thereby change the pressure in the purge system during the diagnosis. Therefore, the conventional diagnostic apparatus has a danger of making a false determination of a fault or failure.

SUMMARY OF THE INVENTION

Accordingly, it is an object of the present invention to provide a diagnostic apparatus and a diagnostic method for a fuel vapor treating apparatus that are capable of sufficiently reducing the effects of external disturbances and achieving more accurate diagnosis by performing diagnosis within a reduced amount of time.

According to one aspect of the invention, there is provided a diagnostic apparatus for a fuel vapor treating apparatus that introduces fuel vapor produced in a fuel tank into an engine intake system through a purge system, the diagnostic apparatus including a flow sensing device for sensing a gas flow between an inside of the purge system and an outside of the purge system, a pressure state detection device for detecting a pressure state in the purge system, a space volume estimation device for estimating a space volume in the purge system on the basis of the gas flow sensed by the flow sensing device and the pressure state detected by the pressure state detection device, and a determination device for determining whether the fuel vapor treating apparatus has a fault on the basis of the space volume in the purge system estimated by the space volume estimation device.

The space volume estimation device estimates the space volume in the purge system, from the gas flow occurring between the inside and the outside of the purge system and the pressure state occurring in the purge system together with the gas flow, on the basis of Boyle-Charles' law. If the purge system has a fault or failure, such as a leak or hole, the space volume in the purge system estimated by the space volume estimation device becomes greater than the actual space volume. Therefore, the determination device determines whether there is a fault or failure on the basis of the space volume estimated by the space volume estimation device.

In the diagnostic apparatus of the invention, the pressure state detection device may include a pressure sensor for detecting a pressure in the purge system. On the basis of an amount of change in the pressure detected by the pressure sensor, the space volume in the purge system is estimated by the space volume estimation device.

Furthermore, the gas flow may be a gas flow discharged from the inside of the purge system to the outside of the purge system by a negative pressure in the engine intake system.

The diagnostic apparatus of the invention may further include a pressure introduction device for introducing a pressure into the purge system. In this diagnostic apparatus, the gas flow between the inside of the purge system and the outside of the purge system occurring during pressure introduction by the pressure introduction device is sensed by the flow sensing device, and the pressure state in the purge system occurring during the pressure introduction by the pressure introduction device is detected by the pressure state detection device.

In this diagnostic apparatus, a negative pressure may be introduced from the engine intake system into the purge system by the pressure introduction device.

Furthermore, the pressure introduction device may include a pressurizing pump for increasing a pressure in the purge system.

The diagnostic apparatus of the invention may further include an actual space volume setting device for setting an actual space volume in the purge system on the basis of an amount of fuel remaining in the fuel tank. In this diagnostic apparatus, it is determined by the determination device whether the fuel vapor treating apparatus has a fault on the basis of a result of comparison between the actual space volume and the space volume estimated by the space volume estimation device.

The total space volume in the purge system can be determined in advance. However, the space volume in the fuel tank, that is, a component of the purge system, varies because the amount of fuel remaining in the fuel tank changes due to fuel consumption, refilling or the like. Therefore, the actual space volume setting device sets an actual space volume, representing the actual volume of space in the purge system, on the basis of the predetermined total space volume and the amount of fuel remaining.

The diagnostic apparatus of the invention may further include a flow control device for varying a relationship between the gas flow occurring during pressure introduction and a duration of the gas flow. In this diagnostic apparatus, the space volume in the purge system is estimated by the space volume estimation device on the basis of a result of a detection by the pressure state detection device separately for each relationship varied by the flow control device. On the basis of a result of comparison between space volumes estimated by the space volume estimation device separately for the varied relationships, it is determined by the determination device whether the fuel vapor treating apparatus has a fault.

The effect of the leak flow caused by a fault or failure is reflected in the estimation of the space volume to a greater extent when the gas flow occurring between the inside and the outside of the purge system during diagnosis is reduced. In a case where the gas flow is changed by the flow control device, the values of space volume estimated by the space volume estimation device separately for different gas flows substantially equal each other provided that there is not a fault such as a leak or hole. However, if a fault or failure has occurred, the effect of the leak flow caused by the fault or failure is reflected to a greater extent in the value of space volume estimated on the basis of a relatively small gas flow, so that the thus-estimated value of space volume becomes different from the value of space volume estimated on the basis of a relatively large gas flow. On the basis of the relationship among the values of space volume estimated separately for different gas flows, it is determined by the determination device whether there is a fault or failure. Instead of varying the gas flow, it is also possible to fix the gas flow and vary the flow time. In such a case, the effect of the leak flow caused by a fault or failure is reflected to a greater extent in the value of space volume estimated on the basis of an increased length of the flow time, so that the thus-estimated space volume becomes different from the space volume estimated on the basis of a reduced length of the flow time. Therefore, it can be determined whether there is a fault or failure, in a manner similar to that described above.

The diagnostic apparatus of the invention may further include a correction device for correcting the pressure state detected by the pressure state detection device, on the basis of an amount of fuel vaporized during diagnosis.

Vaporization of fuel in the fuel tank can affect the pressure state in the purge system during diagnosis. Therefore, if the detection result is corrected by the correction device on the basis of the amount of fuel vaporization, the pressure state in the purge system during diagnosis can be more precisely detected.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the present invention will be described in detail hereinafter with reference to the accompanying drawings.

Figure 1:
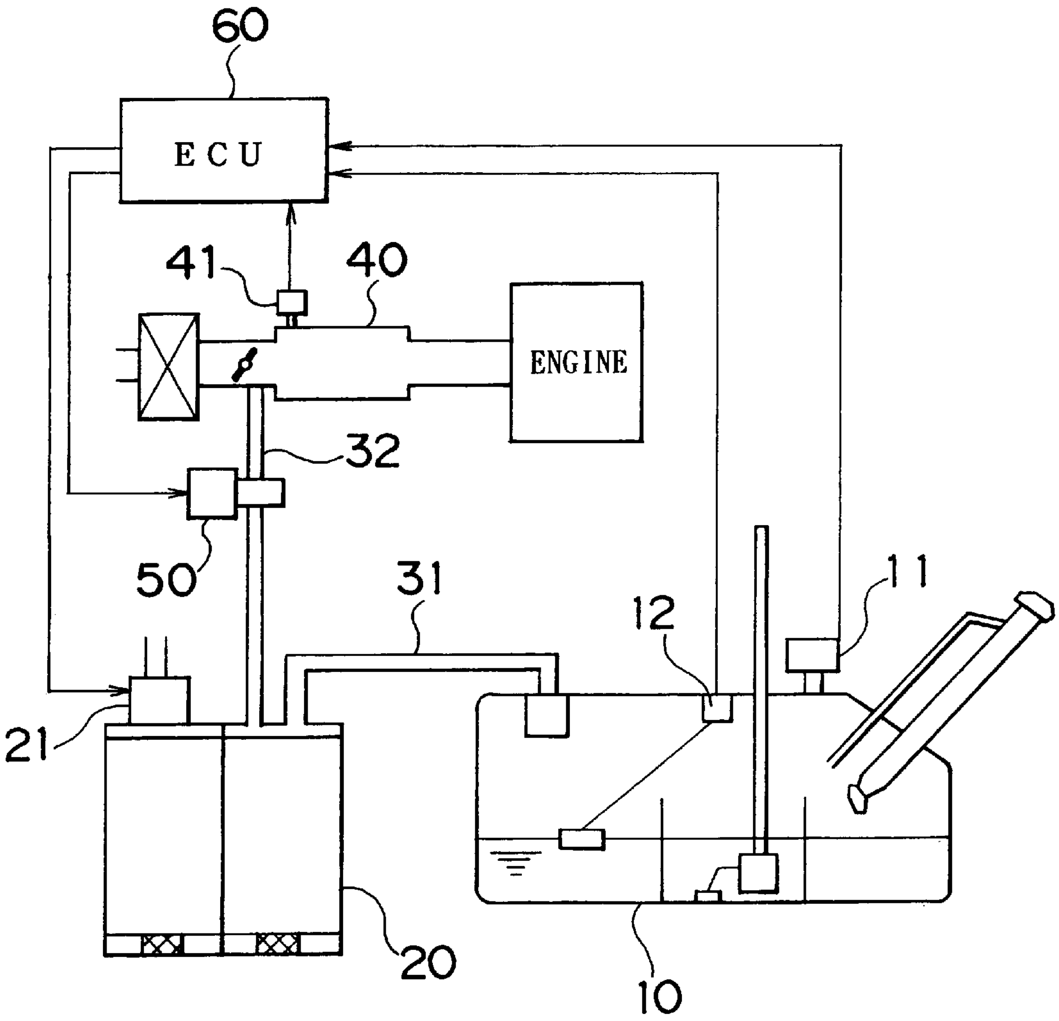
FIG. 1 is a schematic illustration of the construction of a fuel vapor treating apparatus equipped with a diagnostic apparatus according to a first embodiment of the invention.

FIG. 1 is a schematic illustration of a fuel vapor treating apparatus equipped with a diagnostic apparatus according to a first embodiment of the invention. The fuel vapor treating apparatus has a charcoal canister 20 for temporarily adsorbing fuel vapor produced in a fuel tank 10. The charcoal canister 20 and the fuel tank 10 are interconnected by a vapor passage 31. The charcoal canister 20 is also connected to an intake pipe 40 of an internal combustion engine by a purge passage 32. Utilizing the negative pressure produced in the intake pipe 40 during operation of the engine, fuel vapor is desorbed from the charcoal canister 20 and introduced into the intake pipe 40, so that fuel vapor is burned in the combustion chambers of the internal combustion engine. The fuel vapor treating apparatus thus treats fuel vapor.

The purge passage 32 is provided with a purge control valve 50 for opening and closing the purge passage 32. The purge control valve 50 controls the purge flow of fuel vapor into the intake pipe 40 by opening and closing in accordance with a duty ratio corresponding to a duty signal from an electronic control unit (hereinafter, referred to as "ECU") 60.

The charcoal canister 20 is provided with a breather valve 21 that is opened to establish communication between the charcoal canister 20 and the atmosphere during introduction of fuel vapor into the intake pipe 40, and that is closed to shut the charcoal canister 20 from the atmosphere during failure or fault diagnosis. The breather valve 21 is designed to be opened and closed on the basis of a control signal from the ECU 60.

The fuel tank 10 is equipped with a pressure sensor 11 for detecting the pressure in the purge system at the time of diagnosis, and a fuel gauge 12 for detecting the amount of fuel remaining in the fuel tank 10. Results of detection by the pressure sensor 11 and the fuel gauge 12 are inputted to the ECU 60. The intake pipe 40 is also equipped with a pressure sensor 41 for detecting the pressure in the intake pipe 40. Results of detection by the pressure sensor 41 is also inputted to the ECU 60.

A diagnostic method employed by the diagnostic apparatus will be described below.

In this diagnostic method, a space volume in the purge system is estimated on the basis of Boyle-Charles' law. Where the space volume in the purge system to be diagnosed is V; the weight of gas contained in the purged system is G, the pressure of the gas is P; the temperature (absolute temperature) thereof is T; and the gas constant is R, the following equation is given:

$$P*V=G*R*T \quad (1)$$

If, of the amount of gas contained in the purged system, a weight $\Delta G$ of gas flows out of the system and the involved gas flow is Q, the following equation holds with respect to the outflow gas:

$$P*Q=\Delta G*R*T \quad (2)$$

With respect to the state in the purge system after the outflow, the following equation holds:

$$(P-\Delta P)*V=(G-\Delta G)*R*T \quad (3)$$

From equations (1) and (3), $\Delta P*V=\Delta G*R*T$ is obtained. By substitution of equation (2), the following equation is given:

$$V=P*Q/\Delta P \quad (4)$$

Thus, the space volume V in the purge system can be estimated if P, Q and $\Delta P$ are detected. If the purge system diagnosed has a hole or a like fault, the estimated space volume V becomes greater than the actual space volume V0 that is detected beforehand. Therefore, by comparing the estimated and actual space volumes V, V0, a fault or failure of the purge system can be diagnosed. A purge system diagnostic operation will be described with reference to the flowchart of FIG. 2.

Figure 2:
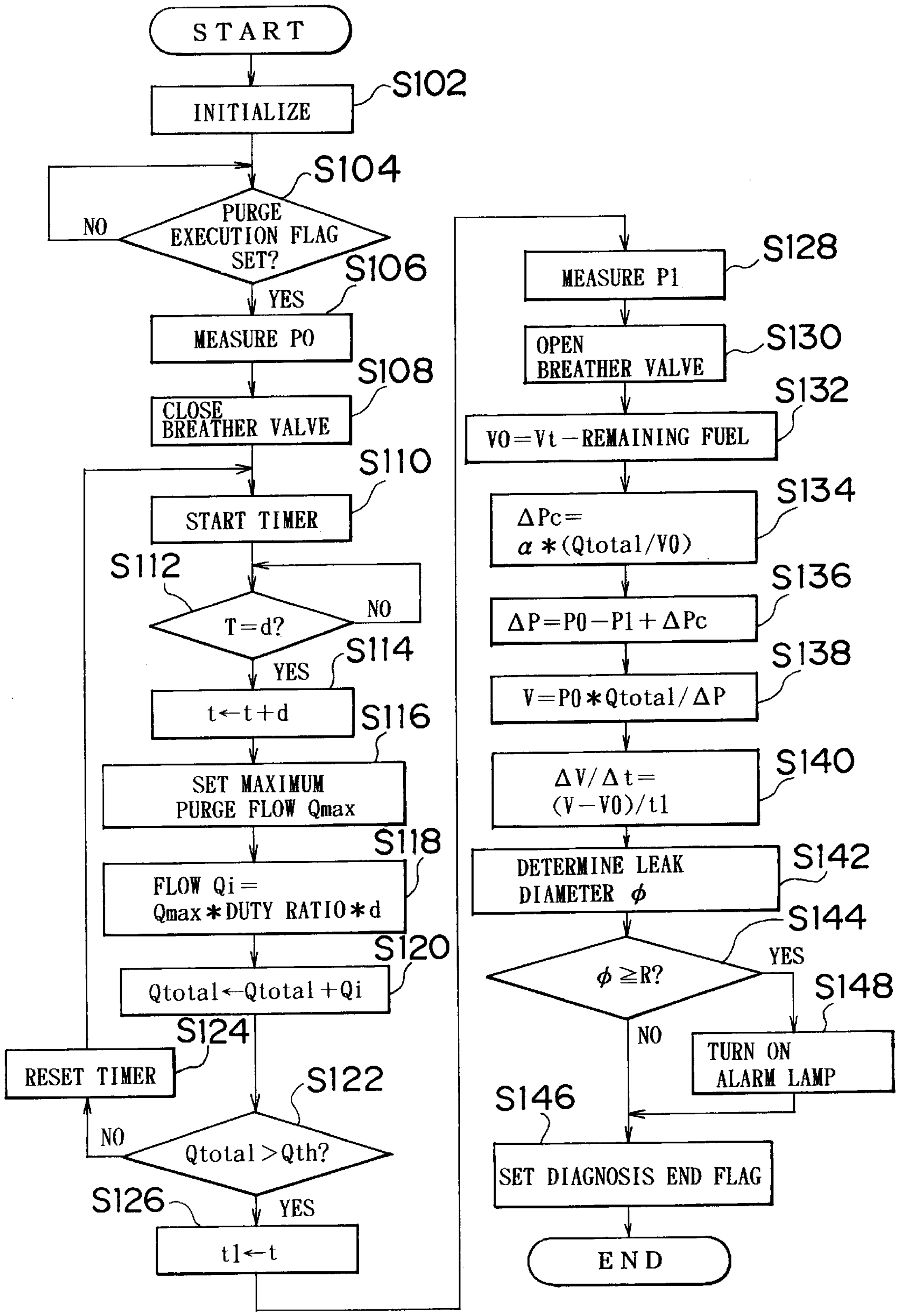
FIG. 2 is a flowchart illustrating a diagnostic operation performed by the diagnostic apparatus shown in FIG. 1.

The operation illustrated in FIG. 2 is started when an ignition switch is turned on. First, in step 102 (hereinafter, "step" is mostly referred to as "S"), initialization is performed, in which diagnostic time t, a purge flow Qtotal, a diagnosis end flag and the like are reset.

Subsequently in S104, it is determined whether a purge execution flag for indicating whether a purge is being performed has been set. The purge execution flag is set when a purge execution condition is met and purge is performed in a separate purge control routine. Step 104 is repeated until the purge execution flag is set.

During purge, the breather valve 21 is open, and atmospheric air is introduced into the purge system via the breather valve 21, due to negative pressure in the intake pipe 40. The open-close operation of the purge control valve 50 is duty-controlled by the ECU 60 so as to control the purge flow into the intake pipe 40.

If the determination in S104 is affirmative, operation proceeds to S106, in which the present pressure P0 in the purge system is measured by the pressure sensor 11. Subsequently in S108, the breather valve 21 is closed, so that atmospheric air flow into the purge system through the breather valve 21 stops.

Subsequently in S110, a timer for measuring the diagnostic time is started. In S112, it is determined whether the time T measured by the timer has reached a predetermined time d. When the time T measured by the timer becomes equal to the predetermined time d, the operation proceeds to step S114, in which the predetermined time d is added to the aforementioned diagnostic time t, thereby updating the diagnostic time t. Since the diagnostic time t is initialized in S102, the value of diagnostic time t is updated to d in S144 in the first execution of this step.

Figure 3:
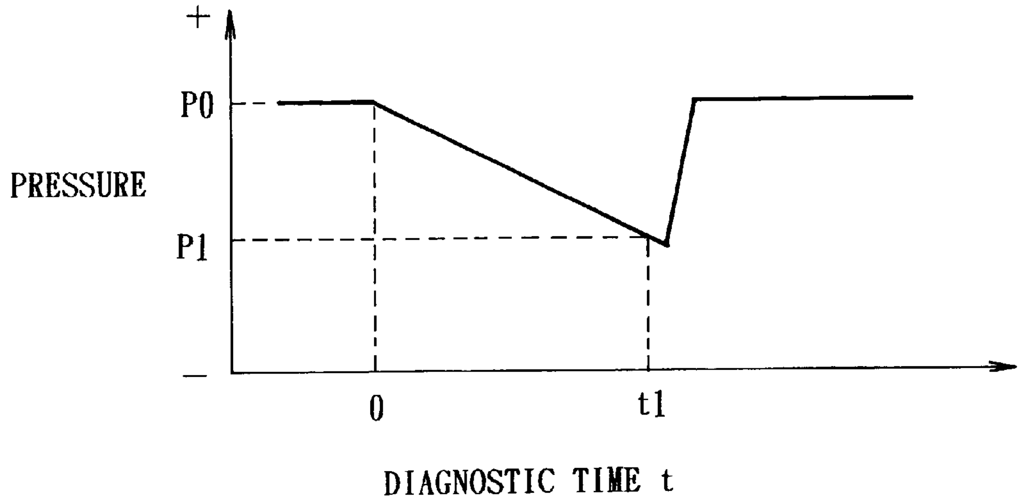
FIG. 3 is a graph indicating the diagnostic time and the state of pressure in the purge system during the diagnostic time.

Since purge is continued, negative pressure is introduced from the intake pipe 40 into the purge system. Therefore, the pressure in the purge system gradually decreases after the time point of the diagnostic time t=0 at which the breather valve 21 is closed in S108, as indicated in FIG. 3.

Figure 4:
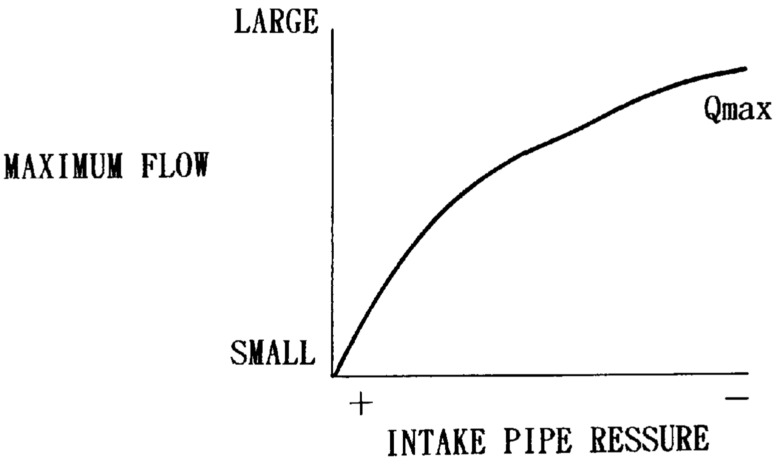
FIG. 4 is a graph indicating the relationship between the intake pipe pressure and the maximum purge flow.

Subsequently in S116, a maximum purge flow Qmax is set on the basis of the pressure in the intake pipe 40 (intake pipe pressure) detected by the pressure sensor 41, as indicated by the graph of FIG. 4.

Subsequently in S118, a purge flow Qi introduced into the purge system up to this moment is calculated from the maximum purge flow Qmax set in S116, the duty ratio of the purge control valve 50 at this moment, and the predetermined time d used in S112, as Qi=Qmax * duty ratio * d.

Subsequently in S120, the value of total purge flow Qtotal is updated by adding the purge flow Qi determined in S118 to the total purge flow Qtotal introduced during the diagnosis. Since the total purge flow Qtotal is initialized in S102, the value of total purge flow Qtotal is updated to Qi in the first execution of S120.

Subsequently in S122, it is determined whether the total purge flow Qtotal has become greater than a predetermined threshold Qth. If the total purge flow Qtotal is not greater than the threshold Qth ("NO" in S122), operation proceeds to S124, in which the diagnostic time measuring timer is reset. Subsequently, the operation starting in S110 is repeated. The operation in S110 through S124 is repeatedly executed until the determination in S122 becomes affirmative.

When it is determined in S122 that the total purge flow Qtotal has become greater than the threshold Qth, operation proceeds to S126, in which the diagnostic time t up to this moment is stored as t1. Subsequently in S128, the present pressure P1 in the purge system is measured by the pressure sensor 11.

Subsequently in S130, the breather valve 21 is opened to introduce atmospheric air into the purge system. When the breather valve 21 is opened, the pressure in the purge system, which has decreased due to the purge, starts to increase again as indicated in FIG. 3, and the normal purge control is started again. That is, the detecting operation involved in the diagnosis ends in S128, and the determining operation in S132 and later steps starts.

In S132, an actual space volume V0 is calculated by subtracting the remaining fuel amount detected by the fuel gauge 12 from the known total space volume Vt in the purge system from the fuel tank 10 to the purge control valve 50, that is, the object of the diagnosis.

Figure 5:
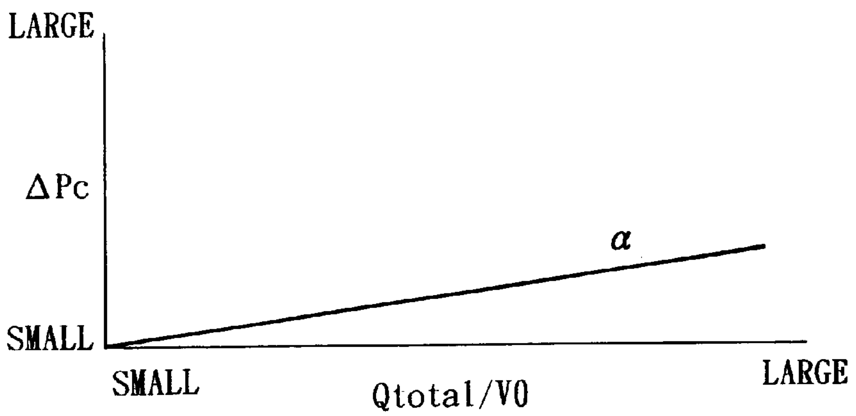
FIG. 5 is a graph indicating the relationship between the total purge flow (Qtotal)/actual space volume V0 of the purge system (Qtotal/V0) and the correction pressure $\Delta Pc$.

Subsequently in S134, a correction pressure $\Delta Pc$ is calculated on the basis of the amount of fuel vaporized during the diagnosis, since vaporization of fuel occurs in the fuel tank 10 during diagnosis and effects the pressure in the purge system. As indicated in FIG. 5, the correction pressure $\Delta Pc$ is proportional to Qtotal/V0. The proportionality factor, that is, the slope $\alpha$ of the line shown in FIG. 5, changes with the diagnostic time. That is, as the diagnostic time increases, the amount of fuel vaporized during that time also increases, and the correction pressure $\Delta Pc$ increases. Thus, the slope $\alpha$ changes with the diagnostic time. In this embodiment, the diagnostic time is set to a short time (for example, about 10 to 20 seconds) so as to set the slope $\alpha$ corresponding to the diagnostic time as a fixed value. By this setting, the correction pressure $\Delta Pc$ itself is set to a small value, so that the correction error is sufficiently reduced.

In S134, the correction pressure $\Delta Pc$ is calculated from the total purge flow Qtotal set in S120 and the actual space volume V0 in the purge system calculated in S132, as $\Delta Pc=\alpha*(Qtotal/V0)$, on the basis of the graph of FIG. 5, which defines the slope $\alpha$ as described above.

Subsequently in S136, a pressure change $\Delta P$ occurring in the purge system during the diagnosis is calculated by using the correction pressure $\Delta Pc$ calculated in S134, as $\Delta P=P0-P1+\Delta Pc$ Subsequently in S138, the space volume V of the purge system is estimated by substituting into equation (4) the values including the pressure change ΔP calculated in S136, and calculating the obtained equation V=P0*Qtotal/ΔP.

Subsequently in 140, using the space volume V0 of the purge system calculated in S132, the space volume V of the purge system estimated in S138, and the diagnostic time t1 stored in S126, an amount of leak flowing out of the purge system per unit time ΔV/Δt is calculated as ΔV/Δt=(V−V0)/t1.

Figure 6:
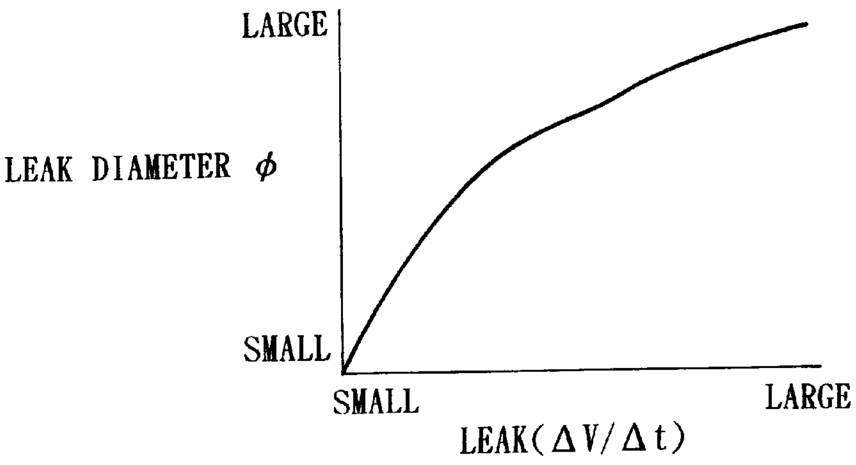
FIG. 6 is a graph indicating the relationship between the amount of leak per unit time ($\Delta V/\Delta t$) and the leak diameter $\phi$.

Subsequently in S142, a leak diameter ϕ corresponding the leak ΔV/Δt is determined on the basis of the graph of FIG. 6. Subsequently in S144, it is determined whether the leak diameter ϕ determined in S142 is equal to or greater than a predetermined value R (for example, R=0.5 mm).

If it is determined in S144 that the leak diameter ϕ is less than the predetermined value R, operation proceeds to S146, in which the diagnosis end flag is set to indicate the end of the diagnosis. Then, the diagnostic routine ends.

Conversely, if it is determined in S144 that the leak diameter ϕ is equal to or greater than the predetermined value R, operation proceeds to S148, in which an alarm lamp is turned on to indicate that a fault or failure has occurred in the purge system, thereby informing a driver. Subsequently, the diagnostic end flag is set in S146, and the diagnostic routine ends.

This manner of diagnosing a fault or failure in the purge system eliminates the need to wait for the convergence of pressure value, which varies during diagnosis, and therefore allows diagnosis to be completed in a reduced amount of time.

A second embodiment of the invention will be described.

Figure 7:
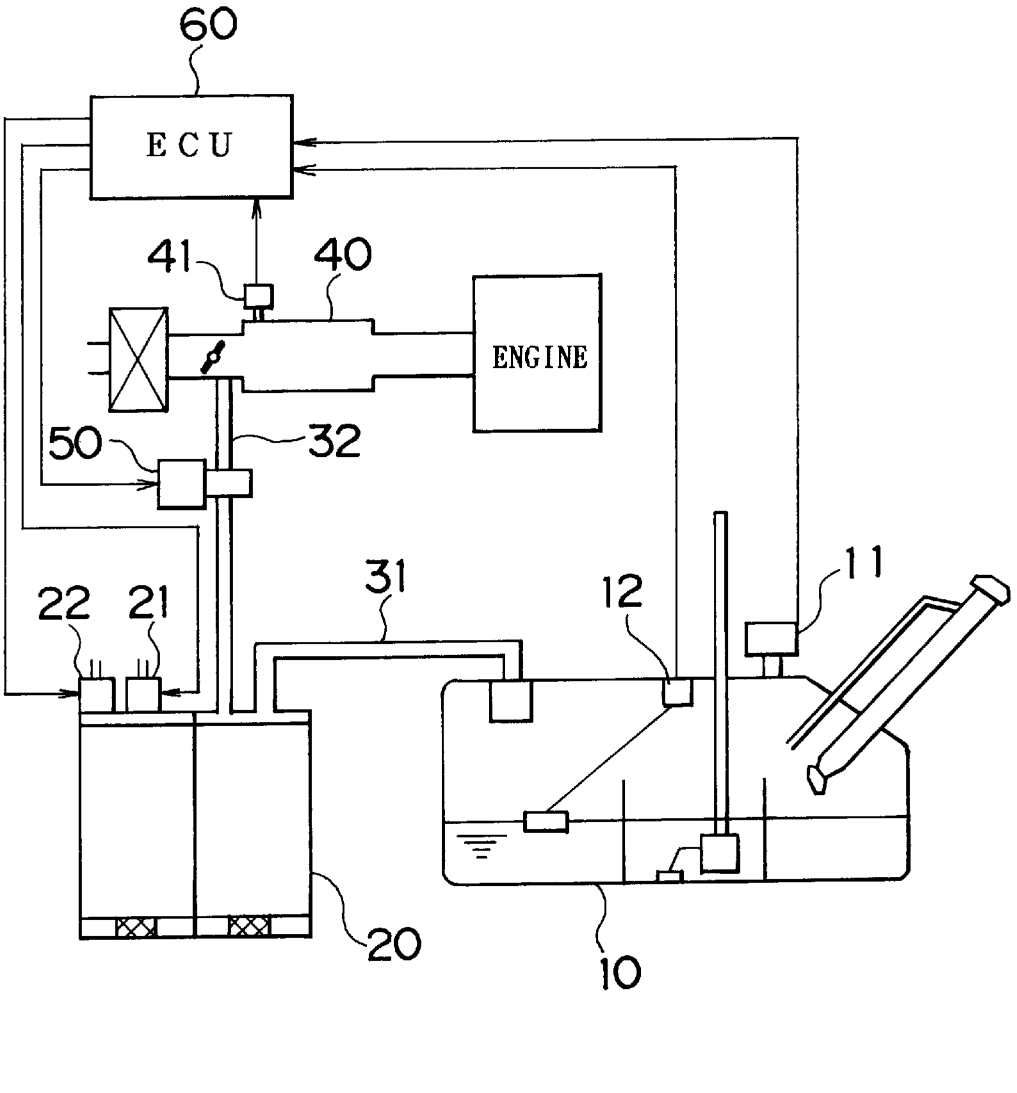
FIG. 7 is a schematic illustration of the construction of a fuel vapor treating apparatus equipped with a diagnostic apparatus according to a second embodiment of the invention.

The second embodiment employs a pressurizing pump 22 disposed on a charcoal canister 20 as shown in FIG. 7, in addition to a breather valve 21 as shown in FIG. 1. A purge system diagnostic operation performed by the apparatus employing the pressurizing pump 22 will be described with reference to the flowchart shown in FIG. 8.

Figure 8:
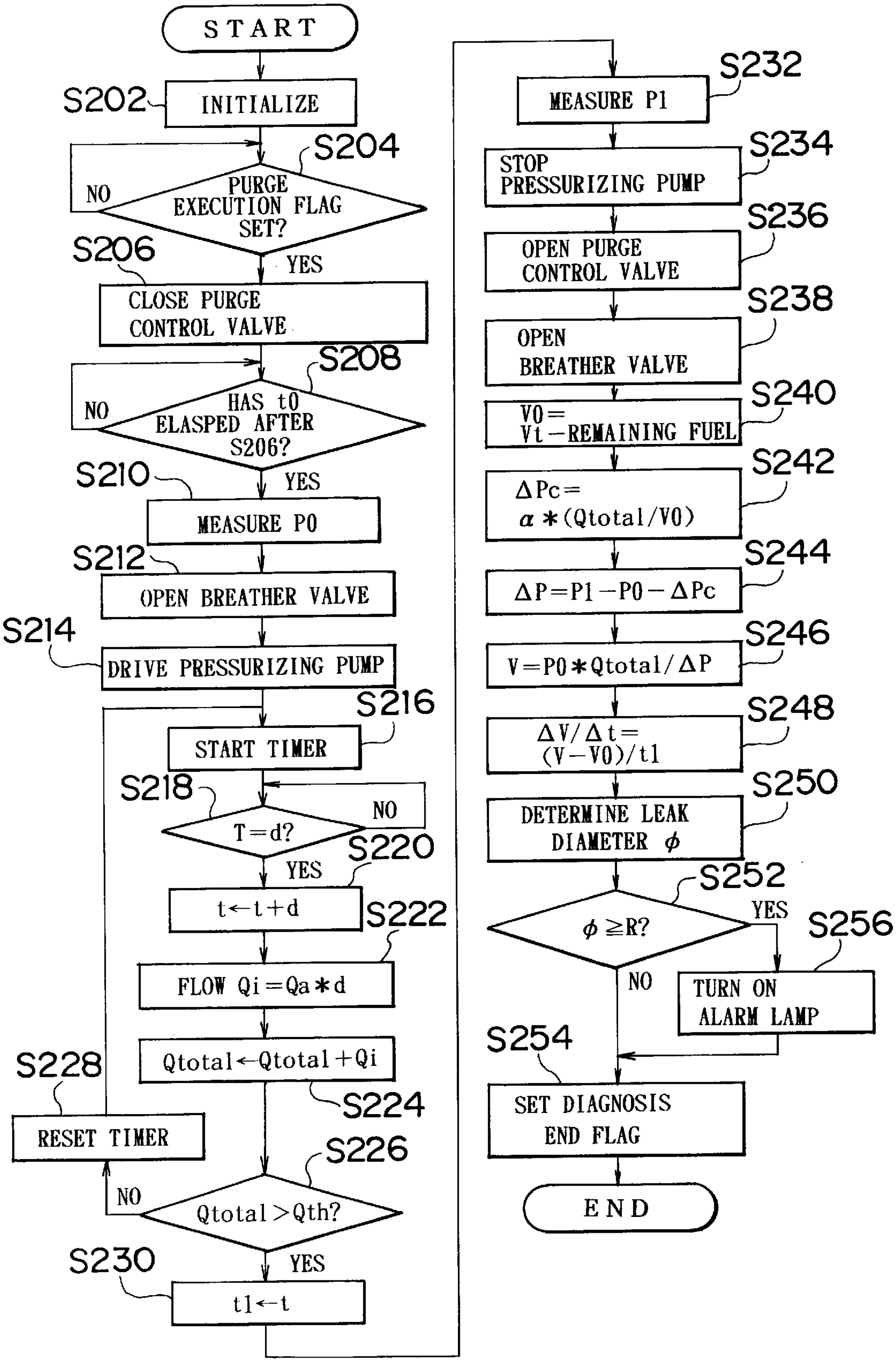
FIG. 8 is a flowchart illustrating a diagnostic operation performed by the diagnostic apparatus according to the second embodiment.

The operation illustrated in FIG. 8 is started when an ignition switch is turned on, as in the operation illustrated in FIG. 2. When the operation is started, initialization is performed in S202, that is, the diagnostic time t, the total purge flow Qtotal, the diagnosis end flag and the like are rest.

Subsequently in S204, it is determined whether the purge execution flag has been set for indicating that purge is being executed. The processing in S204 is repeated until the purge execution flag is set.

When it is determined in S204 that the purge execution flag is set, operation proceeds to S206, in which the purge control valve 50 is closed. When the purge control valve 50 is closed, the communication between the purge system and the intake pipe 40 is discontinued, so that atmospheric air is introduced through the breather valve 21 into the purge system, which has a negative pressure. Subsequently in S208, it is determined whether a time t0 needed for stabilization of the atmospheric introduced into the system has elapsed following the execution of S206.

When it is determined in S208 that the time t0 has elapsed, operation proceeds to S210, in which the present pressure P0 in the purge system is measured by the pressure sensor 11. After the breather valve 21 is closed to shut the purge system in S212, the pressurizing pump 22 is driven in S214.

Subsequently, the timer for measuring the diagnostic time is started in S216. In S218, it is determined whether the time T measured by the timer has reached a predetermined time d. When the time T measured by the timer reaches the predetermined time d, operation proceeds to S220, in which the diagnostic time t is updated by adding the predetermined time d thereto.

Figure 9:
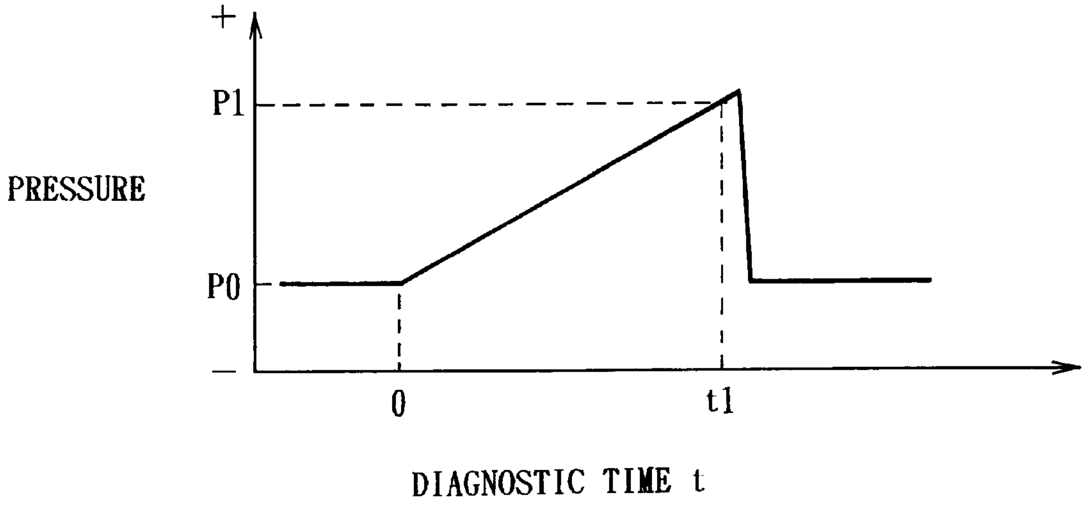
FIG. 9 is a graph indicating the diagnostic time and the state of pressure in the purge system during the diagnostic time according to the second embodiment.

Since the pressurizing pump 22 is operated in S214 while the purge control valve 50 is in the closed position, the pressure in the purge system starts to gradually increase at the diagnostic time t=0, at which the operation of the pressurizing pump 22 is started, as indicated in FIG. 9.

Subsequently in S222, an air flow Qi introduced into the purge system during the time d is determined as Qi=Qa * d where Qa is the known air flow that is introduced therein from the pressurizing pump 22 per unit time.

Subsequently in S224, the total air flow Qtotal introduced into the purge system from the pressurizing pump 22 during the diagnosis is updated by adding thereto the air flow Qi determined in S222.

Subsequently in S226, it is determined whether the value of total purge flow Qtotal updated in S224 is greater than a predetermined threshold Qth. If the total purge flow Qtotal is not greater than the threshold Qth ("NO" in S226), operation proceeds to S228, in which the diagnostic time measuring timer is reset. Then, the operation starting in S216 is repeated. The operation in S216 through S228 is repeatedly executed until the determination in S226 becomes affirmative.

When it is determined in S226 that the total purge flow Qtotal has become greater than the threshold Qth, operation proceeds to S230, in which the diagnostic time t up to this moment is stored as t1. Subsequently in S232, the present pressure P1 in the purge system is measured by the pressure sensor 11.

Subsequently, the pressurizing pump 22 is stopped in S234, and then the purge control valve 50 is opened in S236. In S238, the pressurizing pump 22 is opened to bring the charcoal canister 20 into communication with the atmosphere. Thereby, the normal purge control is started again.

The determining operation executed in S240–S256 is substantially the same as the operation in S132–S148 in the flowchart of FIG. 2, and will not be described again. The difference therebetween is that in the equation used in S244 in FIG. 8, the sign of each term P0, P1, ΔPc is reversed from the sign of the corresponding term in the equation used in S136 in FIG. 2.

Although the second embodiment has been described in conjunction with the construction having the breather valve 21 and the pressurizing pump 22, it is also possible to use the pressurizing pump 22 to perform the function of the breather valve 21 if the pressurizing pump 22 has a function comparable to the valve opening and closing function. If such a pressurizing pump is employed, the breather valve 21 may be omitted.

It is also possible to employ a method in which purge is executed after the purge system is pressurized by the pressurizing pump 22, and the space volume in the purge system is estimated on the basis of the purge flow and the pressure change in the purge system caused by the execution of purge.

A third embodiment of the invention will be described below. In the third embodiment, diagnosis can be performed through depressurization or pressurization in the purge system, as in the first and second embodiments. As for example, an operation where the purge system depressurization method is performed in an apparatus construction as shown in FIG. 1 will be described with reference to the flowchart shown in FIGS. 10 and 11.

Figure 10:
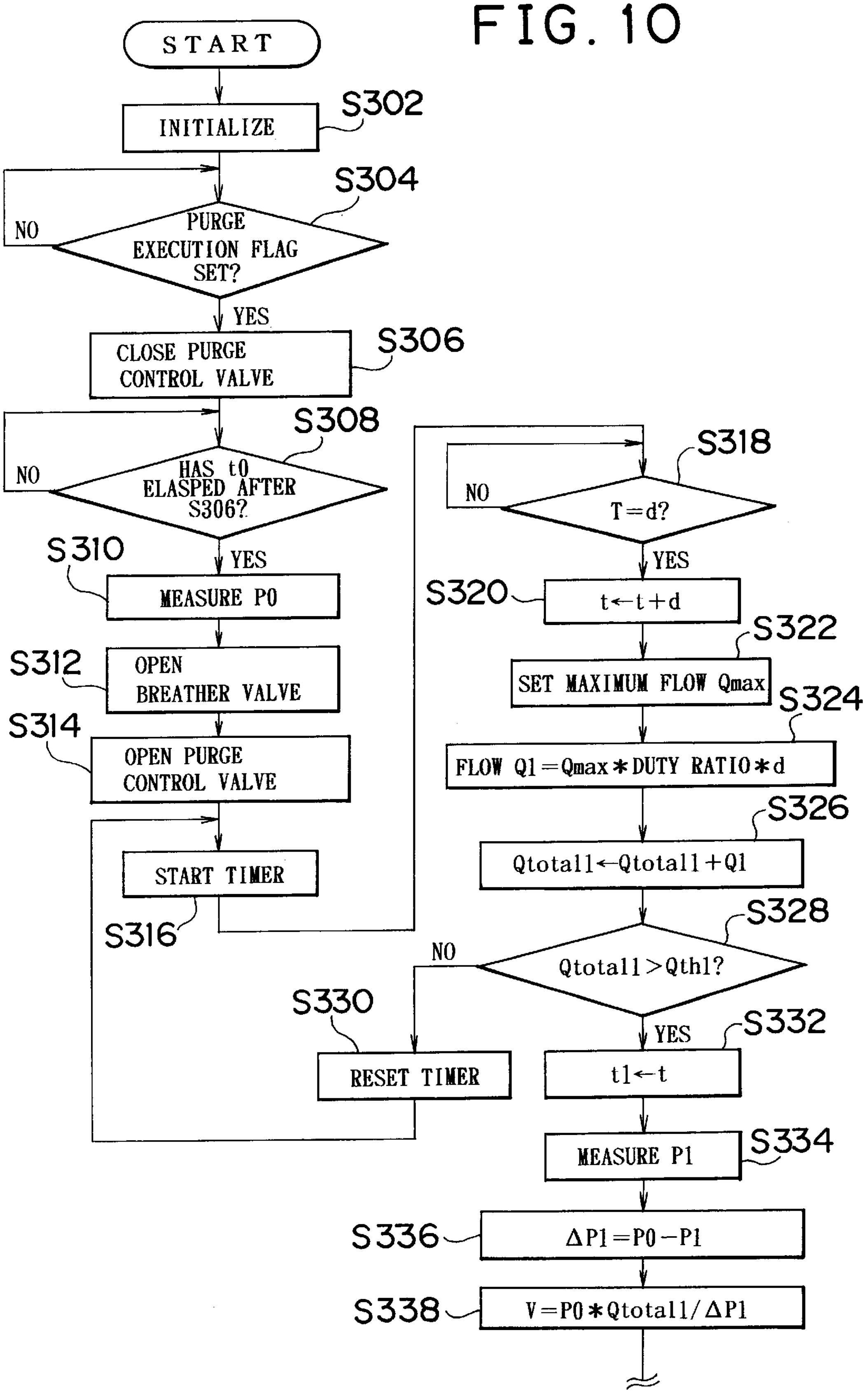
FIG. 10 is a flowchart illustrating a diagnostic operation performed by a fuel vapor treating apparatus according to a third embodiment of the invention.
Figure 11:
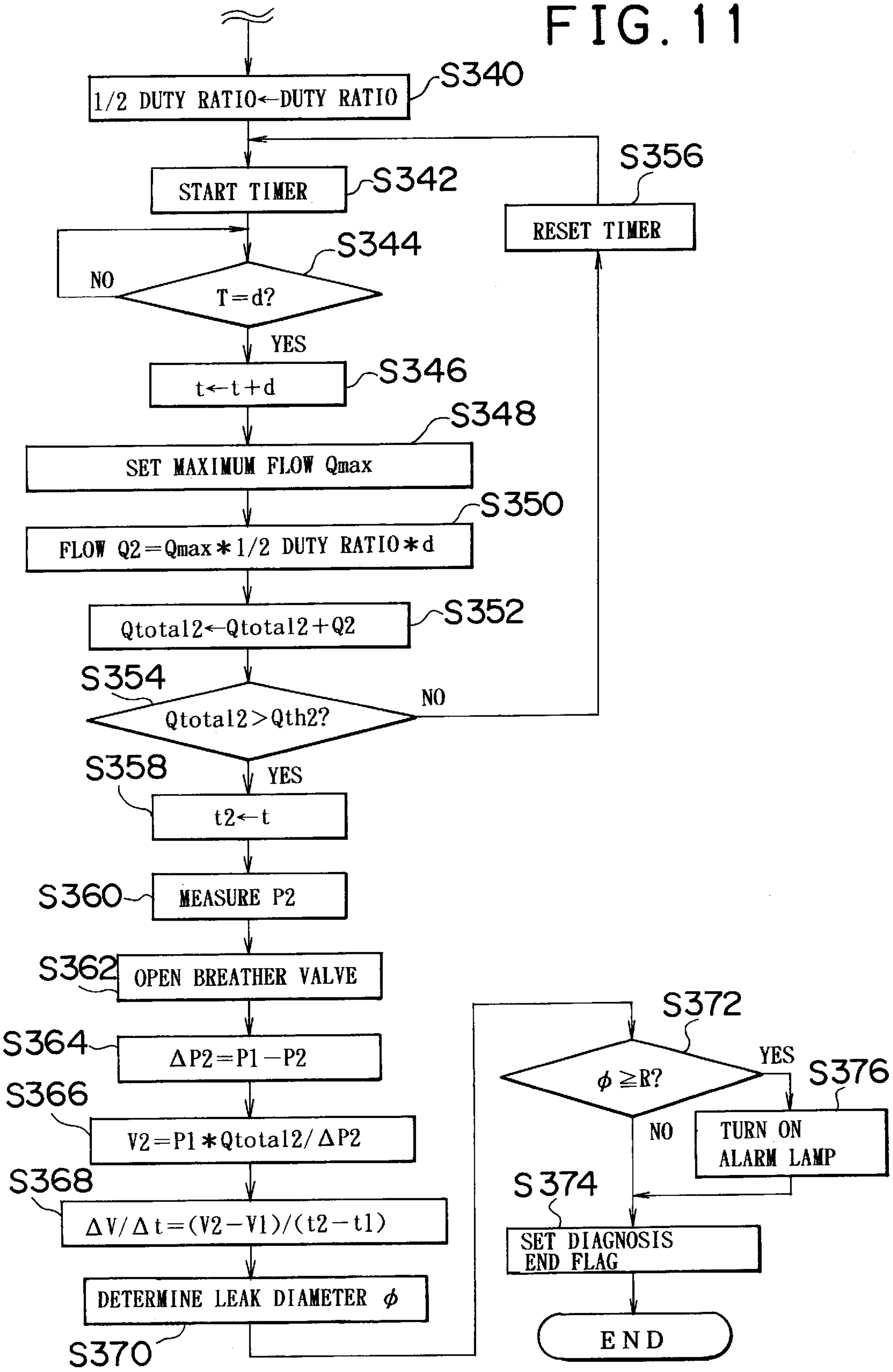
FIG. 11 is a flowchart illustrating the diagnostic operation, continuing from the flowchart of FIG. 10.

The operation illustrated in FIGS. 10 and 11 is started when an ignition switched is turned on, as in the operations in the foregoing embodiments. First, in S302, initialization is performed, that is, the diagnostic time t, the purge flow Qtotal, the diagnosis end flag and the like are rest.

Subsequently in S304, it is determined whether the purge execution flag has been set for indicating that purge is being executed. The processing in S304 is repeated until the purge execution flag is set.

When it is determined in S304 that the purge execution flag is set, operation proceeds to S306, in which the purge control valve 50 is closed. When the purge control valve 50 is closed, the communication between the purge system and the intake pipe 40 is discontinued, so that atmospheric air is introduced through the breather valve 21 into the purge system. Subsequently in S308, it is determined whether a time t0 needed for stabilization of the atmospheric introduced into the system has elapsed following the execution of S306.

When it is determined in S308 that the time t0 has elapsed, operation proceeds to S310, in which the present pressure P0 in the purge system is measured by the pressure sensor 11. Subsequently in S312, the breather valve 21 is closed to shut the purge system.

Subsequently in S314, purge is performed by duty-controlling the opening operation of the purge control valve 50 with a predetermined duty ratio.

After that, the timer for measuring the diagnostic time is started in S316. In S318, it is determined whether the time T measured by the timer has reached a predetermined time d. When the time T measured by the timer reaches the predetermined time d, operation proceeds to S320, in which the diagnostic time t is updated by adding the predetermined time d thereto.

Subsequently in S322, a maximum purge flow Qmax is set on the basis of the pressure in the intake pipe 40 (intake pipe pressure) detected by the pressure sensor 41, with reference to the map indicated in FIG. 4.

Subsequently in S324, a purge flow Q1 introduced into the intake pipe 40 up to this moment is calculated from the maximum purge flow Qmax set in S322, the present duty ratio of the purge control valve 50, and the predetermined time d used in S318, as Q1=Qmax * duty ratio * d.

Subsequently in S326, the total purge flow Qtotal1 introduced during the diagnosis is updated by adding thereto the purge flow Q1 determined in S324.

Subsequently in S328, it is determined whether the value of total purge flow Qtotal1 updated in S326 is greater than a predetermined threshold Qth1. If the total purge flow Qtotal1 is not greater than the threshold Qth1 ("NO" in S328), operation proceeds to S330, in which the diagnostic time measuring timer is reset. Then, the operation starting in S316 is repeated. The operation in S316 through S330 is repeatedly executed until the determination in S328 becomes affirmative.

When it is determined in S328 that the total purge flow Qtotal1 has become greater than the threshold Qth1, operation proceeds to S332, in which the diagnostic time t up to this moment is stored as t1. Subsequently in S334, the present pressure P1 in the purge system is measured by the pressure sensor 11.

Subsequently in S336, a pressure change ΔP1 from the pressure P0 in the purge system measured in S310 and the pressure P1 therein measured in S334 is calculated as ΔP1=P0−P1.

Subsequently in S338, the space volume V1 in the purge system is estimated by substituting the pressure P0 measured in S310, the total purge flow Qtotal1 calculated in S322, and the pressure change ΔP1 calculated in S336 into equation (4), and calculating the obtained equation V1=P0*Qtotal1/ΔP1.

Subsequently in S340 in FIG. 11, the duty ratio of the purge executed in the operation starting in S314 is changed into ½ of the duty ratio, that is, ½ duty ratio, and the opening operation of the purge control valve 50 is duty-controlled with the ½ duty ratio.

Subsequently, the diagnostic time measuring timer is started in S342, and it is determined in S344 whether the time T measured by the timer has reached the predetermined time d. When the time T by the timer reaches the predetermined time d, operation proceeds to S346, in which the diagnostic time t is updated by adding thereto the predetermined time d.

Subsequently in S348, a maximum purge flow Qmax is set on the basis of the pressure in the intake pipe 40 (intake pipe pressure) detected by the pressure sensor 41, with reference to the map indicated in FIG. 4. Subsequently in S350, a purge flow Q2 introduced into the intake pipe 40 up to this moment is calculated from the maximum purge flow Qmax set in S348, the present duty ratio of the purge control valve 50 (½ duty ratio), and the predetermined time d used in S344, as Q2=Qmax *½ duty ratio * d.

Subsequently in S352, the total purge flow Qtotal2 introduced during the diagnosis is updated by adding thereto the purge flow Q2 determined in S350.

Subsequently in S354, it is determined whether the value of total purge flow Qtotal2 updated in S352 is greater than a predetermined threshold Qth2. If the total purge flow Qtotal2 is not greater than the threshold Qth2 ("NO" in S354), operation proceeds to S356, in which the diagnostic time measuring timer is reset. Then, the operation starting in S342 is repeated. The operation in S342 through S356 is repeatedly executed until the determination in S354 becomes affirmative.

When it is determined in S354 that the total purge flow Qtotal2 has become greater than the threshold Qth2, operation proceeds to S358, in which the diagnostic time t up to this moment is stored as t2. Subsequently in S360, the present pressure P2 in the purge system is measured by the pressure sensor 11.

Subsequently in S362, the breather valve 21 is opened to introduce atmospheric air into the purge system. Thereby, the normal purge control is started again.

Subsequently in S364, a pressure change ΔP2 from the pressure P1 in the purge system measured in S334 to the pressure P2 measured in S360 is calculated as ΔP2=P1−P2.

Subsequently in S366, the space volume V2 in the purge system is estimated by substituting the pressure P1 measured in S334, the total purge flow Qtotal2 calculated in S352, and the pressure change ΔP2 calculated in S364 into equation (4), and calculating the obtained equation V2=P1*Qtotal2/ΔP2.

Figure 12:
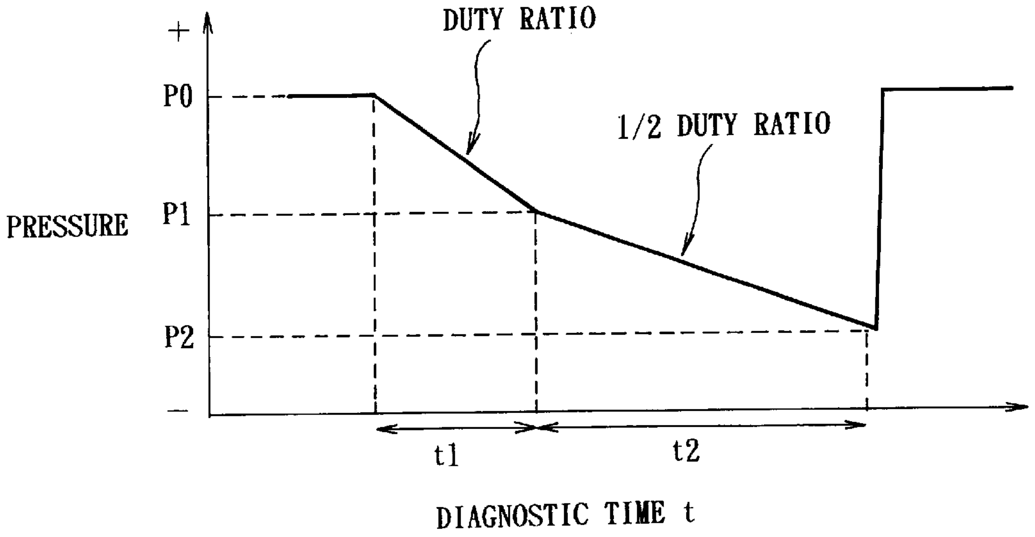
FIG. 12 is a graph indicating the diagnostic time and the state of pressure in the purge system during the diagnostic time according to the third embodiment.

In this manner, the space volume in the purge system is estimated twice with different duty ratios and different lengths of diagnostic time t, so that the changing manner of the pressure in the purge system differs between before and after the change of the duty ratio as indicated in FIG. 12. If there is no fault or failure in the purge system, the estimated values of space volume obtained by the two estimating operations become substantially equal. However, if the purge system has a failure or fault, such as a leak or hole, the estimated value of space volume obtained by the operation using the ½ duty ratio becomes greater than the estimated value obtained by the operation using the duty ratio since the purge flow is less and the diagnostic time t is longer in the operation using the ½ duty ratio, so that the leak flow caused by the failure or fault is reflected to a greater extent in the estimated value obtained with the ½ duty ratio.

Therefore, in S368, an amount of leak flowing out of the purge system per unit time $\Delta V/\Delta t$ is calculated from the space volume V1 estimated in S338, the space volume V2 estimated in S366, and the respective lengths of diagnostic time t1, t2, as $\Delta V/\Delta t=(V2-V1)/(t2-t1)$.

Based on the thus-calculated leak $\Delta V/\Delta t$, the determining operation in S370–S376 is performed. This operation is substantially the same as the operation in S142–148 in FIG. 2, and will not be described again.

Although in the third embodiment, the purge flow indicated by the duty ratio is changed to ½, this is merely illustrative, that is, the purge flow may also be change in other appropriate manners. However, it is preferable that the difference in purge flow be great so as to cause the effect of a failure or fault, such as a leak or hole, to show on the smaller flow side to a greater extent.

Although in the third embodiment, the purge flow (the duty ratio and the ½ duty ratio) and the flow time (the diagnostic time t1 and the diagnostic time t2) during diagnosis are both varied, it is also possible to fix the purge flow and vary the diagnostic time (for example, the diagnostic time t1 and the diagnostic time t2 as in the case indicated in FIG. 12) for diagnosis. In this case, the effect of the leak flow caused by a failure or fault shows to a greater extent on the value of space volume estimated by using the longer flow time. Therefore, by comparing the values of space volume estimated by using the long and short lengths of flow time, diagnosis can be performed. It is also possible to perform diagnosis by maintaining constant diagnostic time t (that is, t1=t2) but varying the purge flow (duty ratio), for example, the duty ratio and the ½ duty ratio as in the case indicated in FIG. 12.

Although in the third embodiment, the space volume is estimated twice under different amounts of purge flow and/or flow time, it is also possible to perform diagnosis on the basis of relationships between estimated values of space volume in three or more different purge flow and the flow time values. In this case, for each relationship between the particular purge flow and flow time value, the space volume in the purge system is estimated on the basis of a pressure change in the purge system occurring under the respective conditions. By comparing the thus-estimated values of space volume, diagnosis is performed. By performing the estimating operation a plurality of times, the precision of the diagnosis can be improved.

Although in the foregoing embodiments, the routine for diagnosis is separately performed, it is also possible to perform diagnosis in a main routine for performing fuel injection amount control including the purge control.

Furthermore, although in the foregoing embodiments, the pressure in the purge system is detected by the pressure sensor 11 provided in the fuel tank 10, the pressure sensor 11 may also be provided in the vapor passage 31 or the charcoal canister 20.

As is apparent from the foregoing description, the first to third embodiments of the invention are able to quickly determine whether the fuel vapor treating apparatus has a failure or fault on the basis of estimated values of space volume. Therefore, the embodiments are able to complete diagnosis in a reduced time without needing to wait for pressure values to converge. Consequently, the effect of external disturbances during diagnosis can be sufficiently reduced, so that more accurate diagnosis can be performed.

While the present invention has been described with reference to what are presently considered to be preferred embodiments thereof, it is to be understood that the invention is not limited to the disclosed embodiment or constructions. To the contrary, the invention is intended to cover various modifications and equivalent arrangements.

What is claimed is:

1. A diagnostic apparatus for a fuel vapor treating apparatus that introduces fuel vapor produced in a fuel tank into an engine intake system through a purge system, comprising:

flow sensing means for sensing a gas flow between an inside of the purge system and an outside of the purge system;

pressure state detection means for detecting a pressure state inside the purge system;

space volume estimation means for estimating a space volume inside the purge system on the basis of the gas flow sensed by the flow sensing means and the pressure state detected by the pressure state detection means; and determination means for determining whether the fuel vapor treating apparatus has a fault on the basis of the space volume estimated by the space volume estimation means.

2. A diagnostic apparatus according to claim 1, wherein the pressure state detection means includes a pressure sensor for detecting a pressure in the purge system, and the space volume in the purge system is estimated by the space volume estimation means on the basis of an amount of change in the pressure detected by the pressure sensor.

3. A diagnostic apparatus according to claim 1, wherein the gas flow is a gas flow discharged from the purge system into the engine intake system by a negative pressure in the engine intake system.

4. A diagnostic apparatus according to claim 1, further comprising pressure introduction means for introducing a pressure into the purge system, wherein the gas flow between the inside of the purge system and the outside of the purge system occurring during pressure introduction by the pressure introduction means is sensed by the flow sensing means, and wherein the pressure state in the purge system occurring during the pressure introduction by the pressure introduction means is detected by the pressure state detection means.

5. A diagnostic apparatus according to claim 4, wherein a negative pressure is introduced from the engine intake system into the purge system by the pressure introduction means.

6. A diagnostic apparatus according to claim 4, wherein the pressure introduction means includes a pressurizing pump for increasing a pressure inside the purge system.

7. A diagnostic apparatus according to claim 1, further comprising actual space volume setting means for setting an actual space volume in the purge system on the basis of an amount of fuel remaining in the fuel tank, wherein it is determined by the determination means whether the fuel vapor treating apparatus has a fault on the basis of a result of a comparison between the actual space volume and the space volume estimated by the space volume estimation means.

8. A diagnostic apparatus according to claim 1, wherein the space volume in the purge system is estimated by the space volume estimation means on the basis of a result of detection by the pressure state detection means separately for each of relationships varied by the flow control means, the apparatus further comprising flow control means for varying one of a rate of gas flow occurring during pressure introduction and a duration of the gas flow to achieve a plurality of relationships between the gas flow rate and the duration of the gas flow, and wherein the determination means determines whether the fuel vapor treating apparatus has a fault on the basis of a comparison between a first space volume estimated by the space volume estimation means based on a first one of the relationships and a second space volume estimated by the by the space volume estimation means based on a second one of the relationships.

9. A diagnostic apparatus according to claim 1, further comprising correction means for correcting the pressure state detected by the pressure state detection means on the basis of an amount of fuel vaporized during diagnosis.

10. A diagnostic method for a fuel vapor treating apparatus that introduces fuel vapor produced in a fuel tank into an engine intake system through a purge system, comprising the steps of:

sensing gas flow between an inside of the purge system and an outside of the purge system;

detecting a pressure state inside the purge system;

estimating a space volume inside the purge system on the basis of the sensed gas flow and the detected pressure state; and determining whether the fuel vapor treating apparatus has a fault on the basis of the estimated space volume.

11. A diagnostic method according to claim 10, wherein a pressure inside the purge system is detected in the pressure state detecting step and wherein in the space volume estimating step, the space volume in the purge system is estimated on the basis of an amount of change in the pressure detected in the pressure state detecting step.

12. A diagnostic method according to claim 10, wherein the sensed gas flow is a gas flow discharged from the inside of the purge system to the outside of the purge system by a negative pressure in the engine intake system.

13. A diagnostic apparatus according to claim 10, further comprising the step of introducing a pressure into the purge system, wherein in the flow sensing step, gas flow is sensed between the inside of the purge system and the outside of the purge system during the introduction of pressure into the purge system, and wherein in the pressure state detecting step, the pressure state in the purge system is detected during the introduction of pressure into the purge system.

14. A diagnostic method according to claim 13, wherein in the pressure introducing step, a negative pressure is introduced from the engine intake system into the purge system.

15. A diagnostic method according to claim 13, wherein in the pressure introducing step, a pressure inside the purge system is increased.

16. A diagnostic method according to claim 10, further comprising the step of setting an actual space volume inside the purge system on the basis of an amount of fuel remaining in the fuel tank, wherein in the determining step, it is determined whether the fuel vapor treating apparatus has a fault on the basis of a result of a comparison between the actual space volume and the estimated space volume.

17. A diagnostic method according to claim 10, further comprising the step of varying a relationship between the gas flow occurring during pressure introduction and a duration of the gas flow, wherein in the space volume estimating step, the space volume in the purge system is estimated on the basis of a result of the pressure state detected for each of a plurality of relationships varied in the flow controlling step, and wherein in the determining step, it is determined whether the fuel vapor treating apparatus has a fault on the basis of a result of a comparison between space volumes estimated in the space volume estimating step separately for the varied relationships.

18. A diagnostic method according to claim 10, further comprising a correcting step of correcting the pressure state detected in the pressure state detecting step on the basis of an amount of fuel vaporized during diagnosis.

19. A diagnostic apparatus for a fuel vapor treating apparatus that introduces fuel vapor produced in a fuel tank into an engine intake system through a purge system, comprising:

a flow sensor that senses a gas flow between an inside of the purge system and an outside of the purge system;

a pressure state detector that detects a pressure state inside the purge system; and a processor coupled to the flow sensor and the pressure state detector, wherein the processor estimates a space volume in the purge system on the basis of the gas flow sensed by the flow sensor and the pressure state detected by the pressure state detector, and wherein the processor determines whether the fuel vapor treating apparatus has a fault on the basis of the estimated space volume.

20. A diagnostic apparatus according to claim 19, further comprising a pressure introducer that introduces a pressure into the purge system, wherein the flow sensor senses the gas flow between the inside of the purge system and the outside of the purge system during the introduction of pressure into the purge system, and wherein the pressure state detector detects the pressure state in the purge system during the introduction of pressure into the purge system.

* * * * *